Aug. 19, 1958  L. DAVOUS  2,848,132
PACKING MEANS

Filed Jan. 25, 1951  11 Sheets-Sheet 1

Inventor
Leon Davous
By Robert E Burns
Attorney

Aug. 19, 1958     L. DAVOUS     2,848,132

PACKING MEANS

Filed Jan. 25, 1951     11 Sheets-Sheet 2

Inventor
Leon Davous
By Robert E. Burns
Attorney

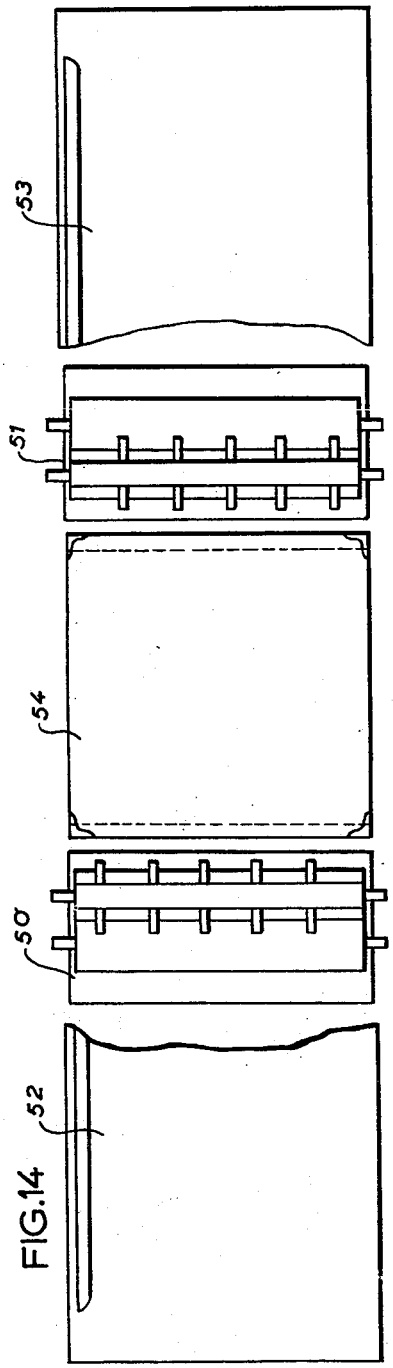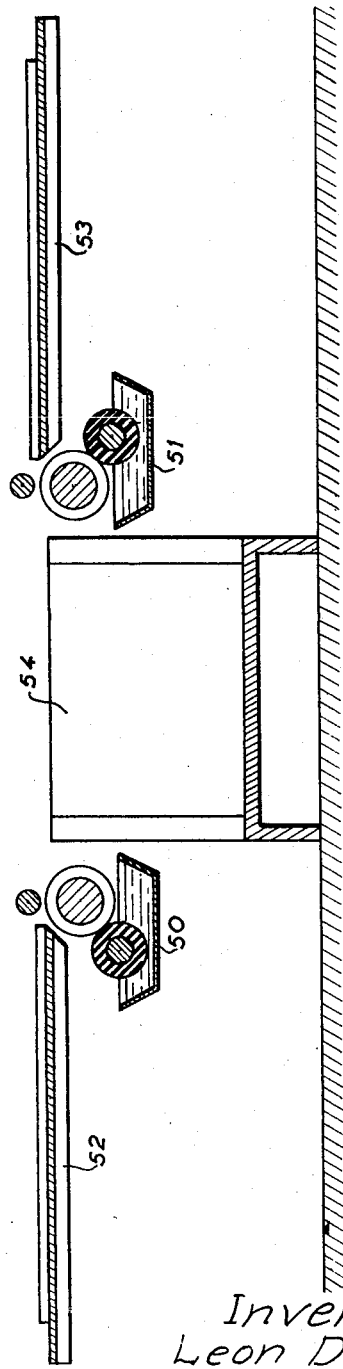

Aug. 19, 1958    L. DAVOUS    2,848,132
PACKING MEANS

Filed Jan. 25, 1951    11 Sheets—Sheet 4

Inventor
Leon Davous
By Robert E. Burns
Attorney

Aug. 19, 1958  L. DAVOUS  2,848,132
PACKING MEANS
Filed Jan. 25, 1951  11 Sheets-Sheet 5

Inventor
Leon Davous
By Robert E. Burns
Attorney

Aug. 19, 1958 — L. DAVOUS — 2,848,132
PACKING MEANS
Filed Jan. 25, 1951 — 11 Sheets-Sheet 6

Inventor
Leon Davous
By Robert E. Burns
Attorney

Aug. 19, 1958 L. DAVOUS 2,848,132
PACKING MEANS
Filed Jan. 25, 1951 11 Sheets-Sheet 7

Inventor
Leon Davous
By Robert E. Burns
Attorney

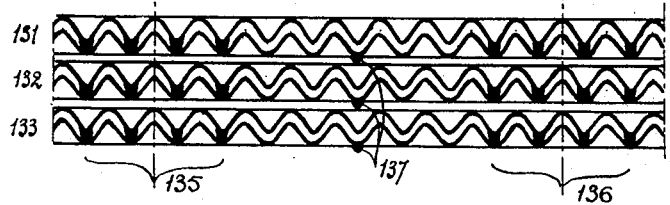
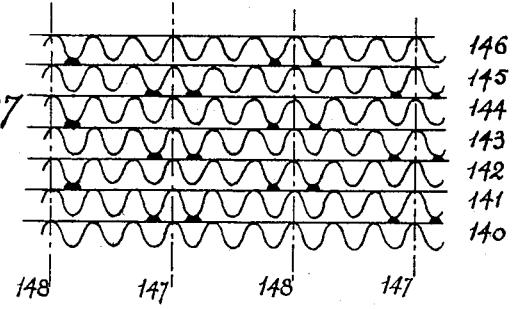
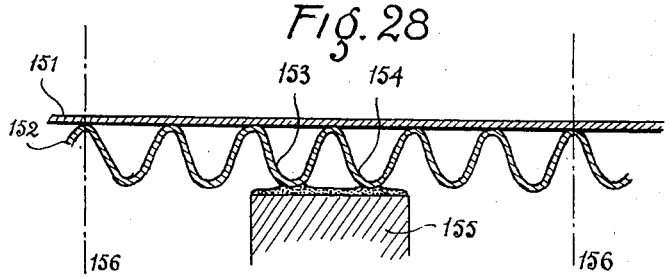
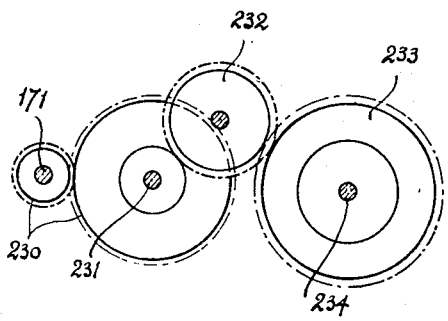
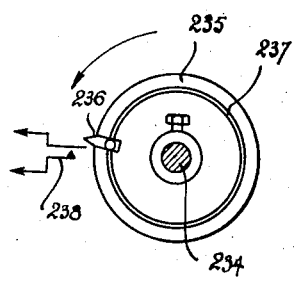

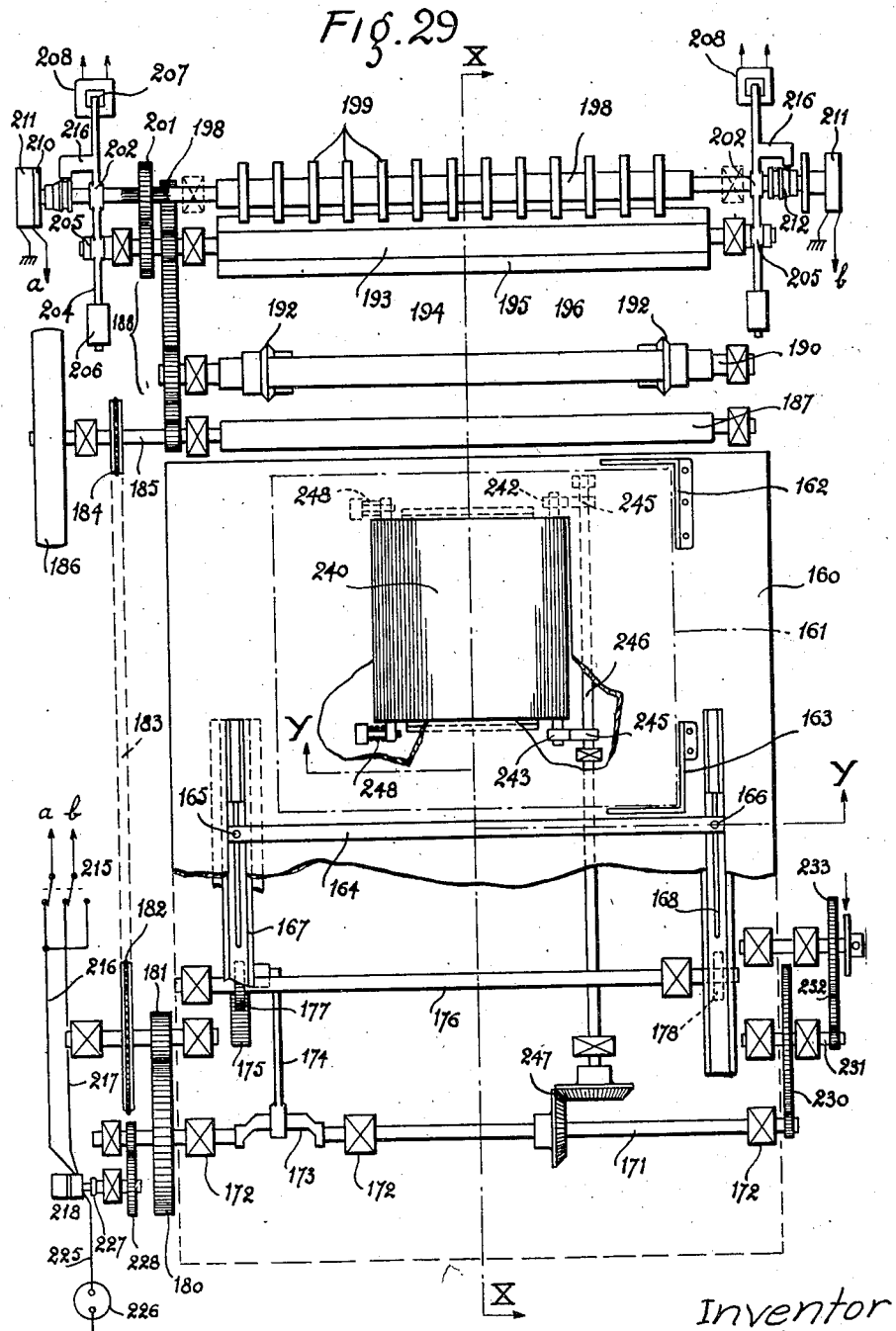

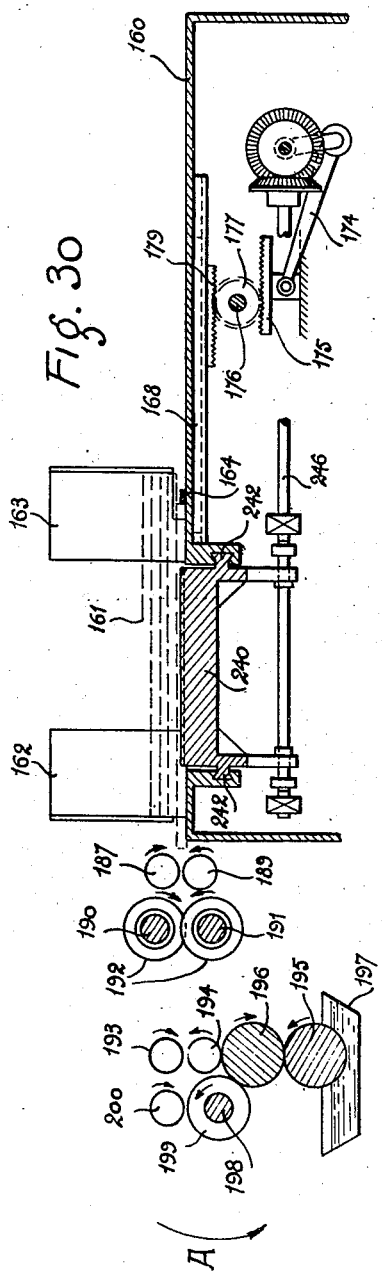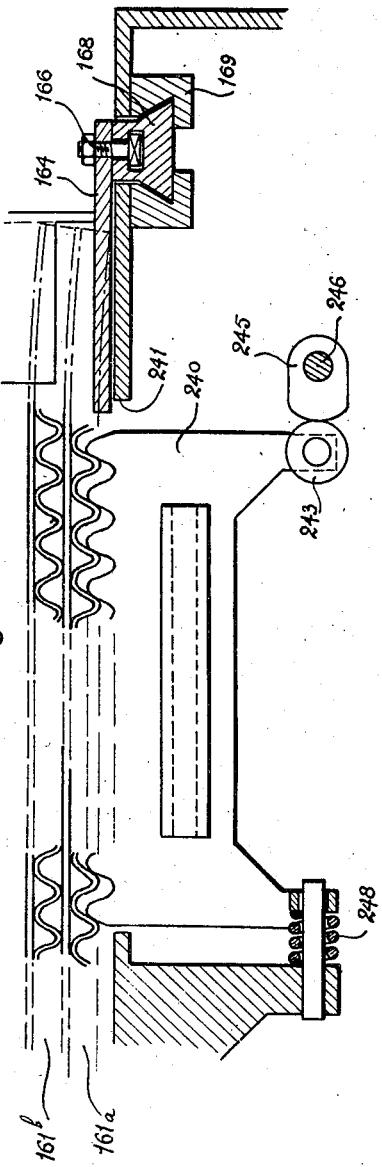

Aug. 19, 1958   L. DAVOUS   2,848,132
PACKING MEANS
Filed Jan. 25, 1951   11 Sheets-Sheet 11
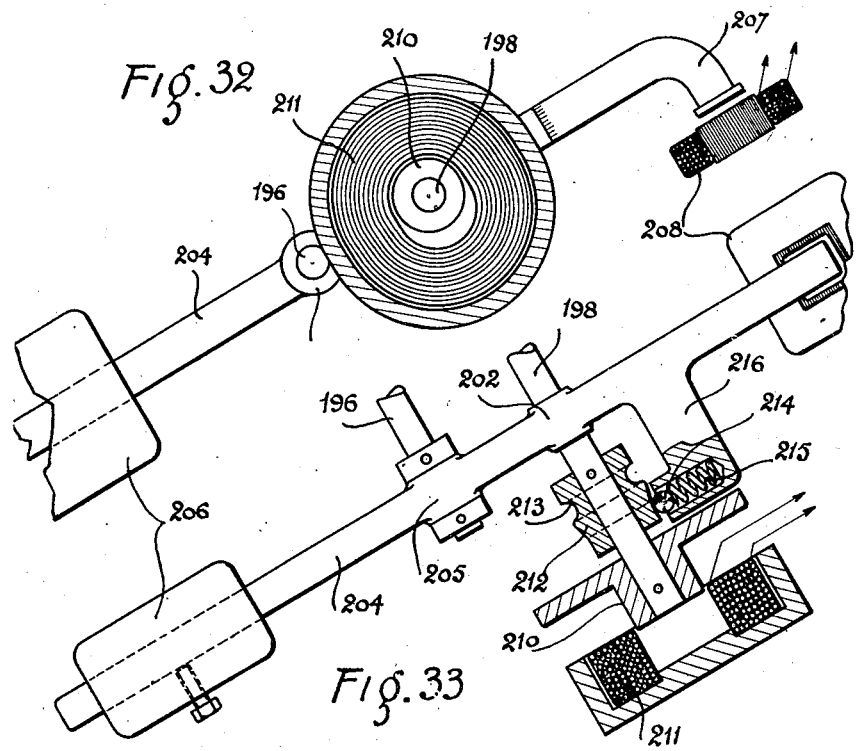
Fig. 32
Fig. 33
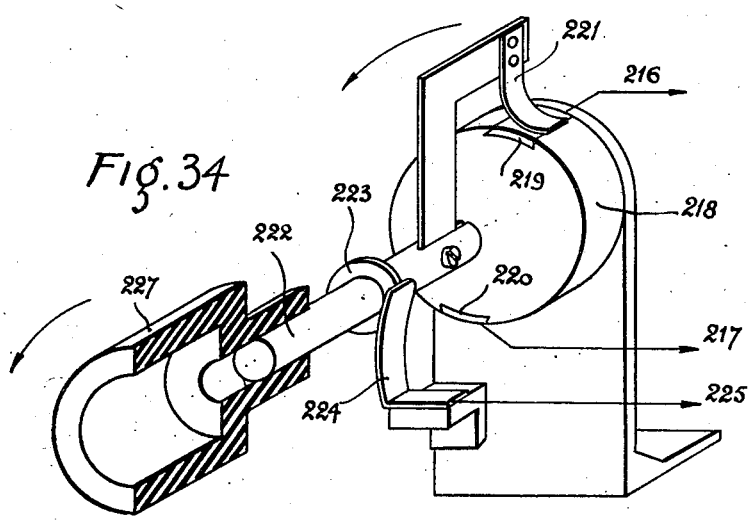
Fig. 34
Inventor
Leon Davous
By Robert E. Burns
Attorney United States Patent Office 2,848,132
Patented Aug. 19, 1958

2,848,132

PACKING MEANS

Léon Davous, Uzerche, France

Application January 25, 1951, Serial No. 207,760

Claims priority, application France January 26, 1950

14 Claims. (Cl. 217—23)

This invention relates to packing means for the transportation and storage of fragile and/or small-sized articles, such as eggs, fruit, bottles, flasks, electric bulbs, and so on.

The invention more particularly relates to packing means of the type consisting of a network or mesh of cross-members or partitions defining a network of cells or cavities each adapted to receive an individual article to be packed.

One object of the invention is to produce at very low cost such cell structures in infinitely variable sizes and shapes capable of automatically adapting themselves owing to a suitable resiliency thereof to the particular articles which are to be placed in them, even where the individual articles may present notable dimensional variations.

A more specific object is to provide packing means for eggs, fruit, etc., convenient to use, cheap in cost, enabling the articles packed therein to be transported under conditions of protection against breakage satisfying the most stringent specifications, adapted to display the articles for sale attractively, and adapted for the preservation of the packed articles in cold storage when necessary.

In one embodiment of the invention, such packing means are capable of being separated into individual cases for articles which are to be sold by the unit. It is accordingly an object of the invention to provide both for the manufacture and the dispensation of such individual cases in advantageous industrial and commercial conditions.

The invention describes methods of manufacturing such packing means as well as apparatus for carrying the method into effect.

The features and advantages of the invention will appear from the ensuing description relating to some exemplary forms of embodiment thereof, and from the accompanying drawings wherein:

Figs. 1 and 2 respectively illustrate in elevation and plan a pad or stack of gummed sheets according to the invention;

Figs. 3 to 9 show various examples of typical cell-structure configurations;

Fig. 10 diagrammatically illustrates in vertical section apparatus according to the invention;

Figure 4:
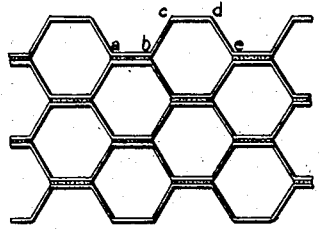
Figure 6:
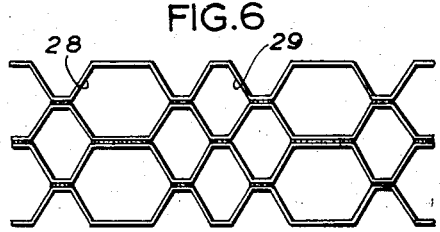
Figure 15:
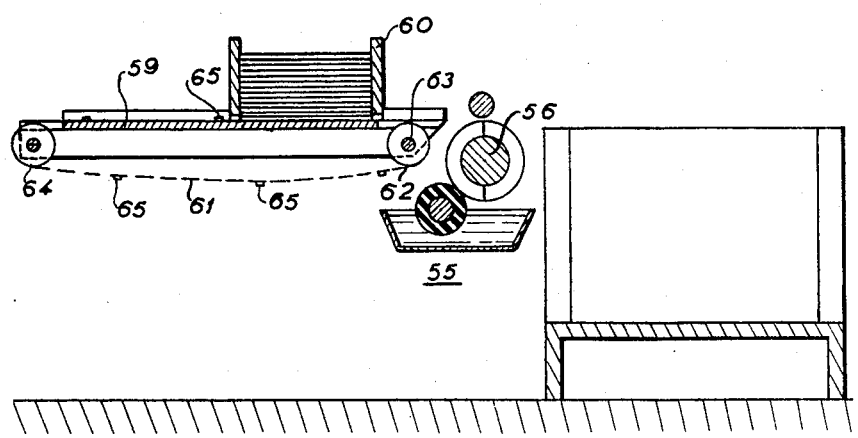
Figure 16:
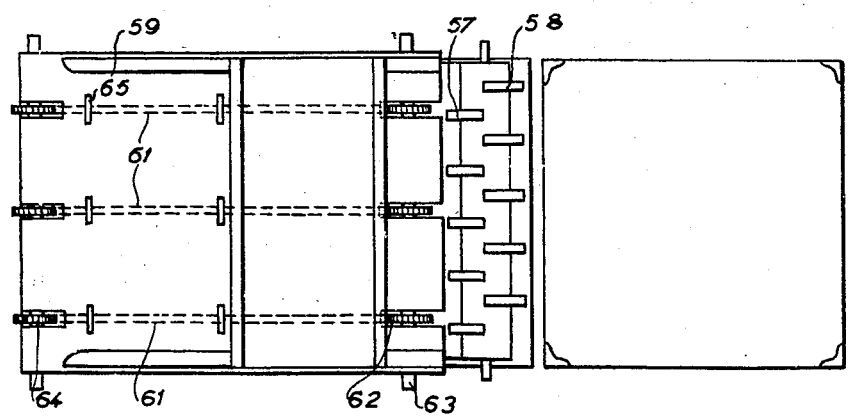
Figure 17:
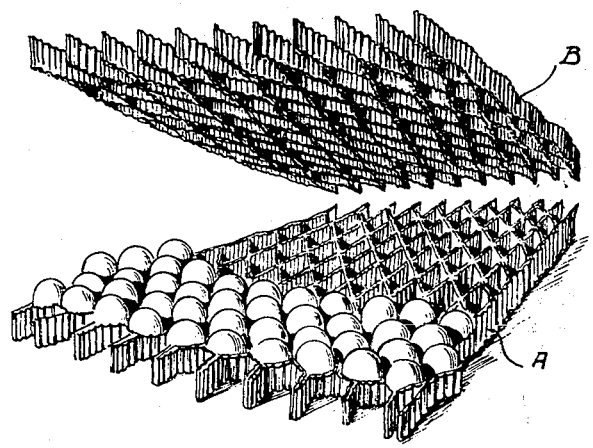
Figure 18:
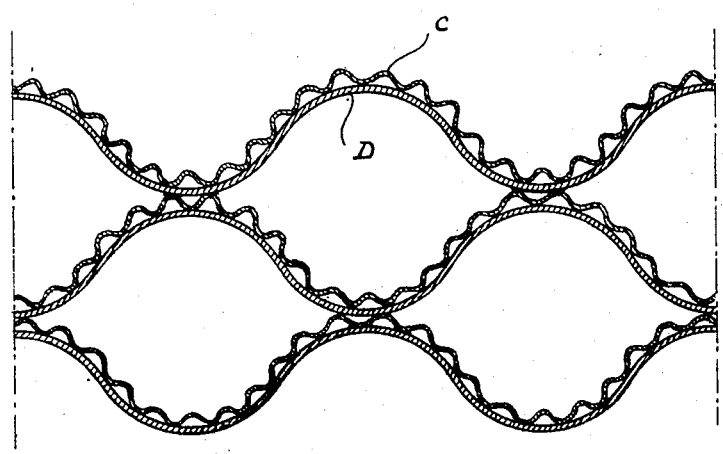
Figure 19:
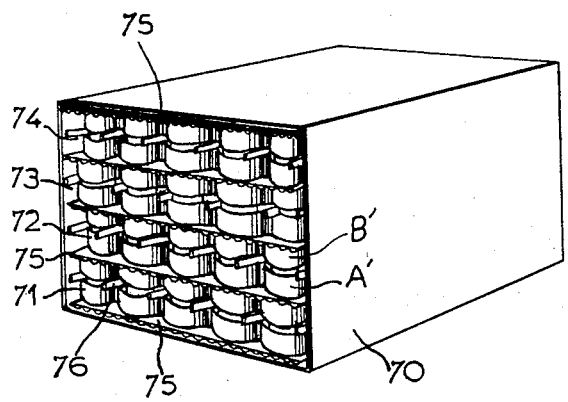
Figure 20:
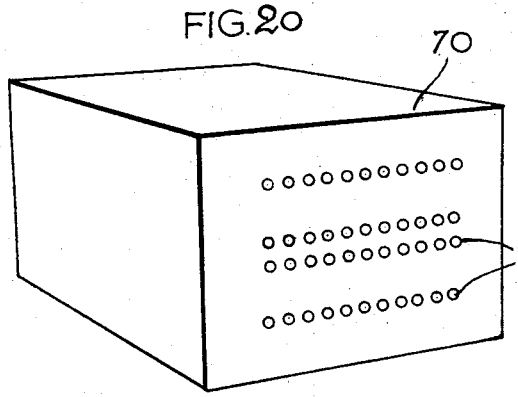
Figure 21:
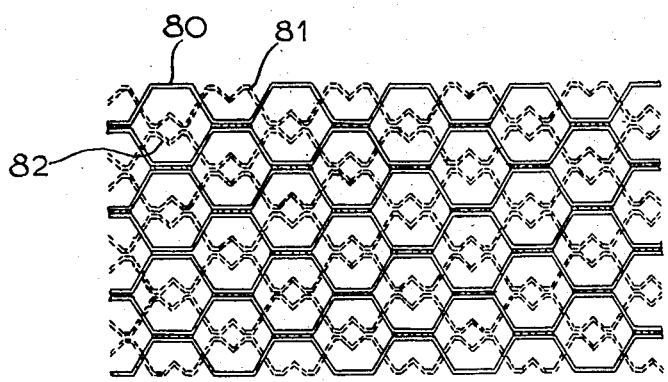
Figure 22:
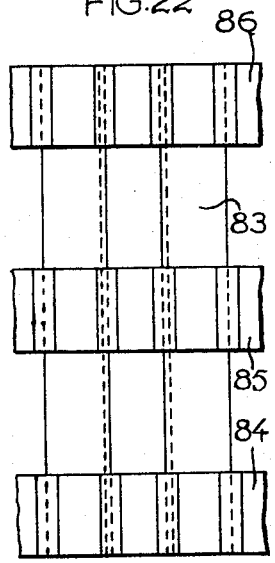
Figure 23:
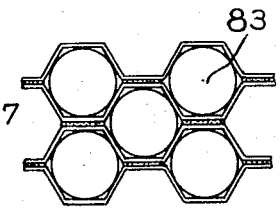
Figure 24:
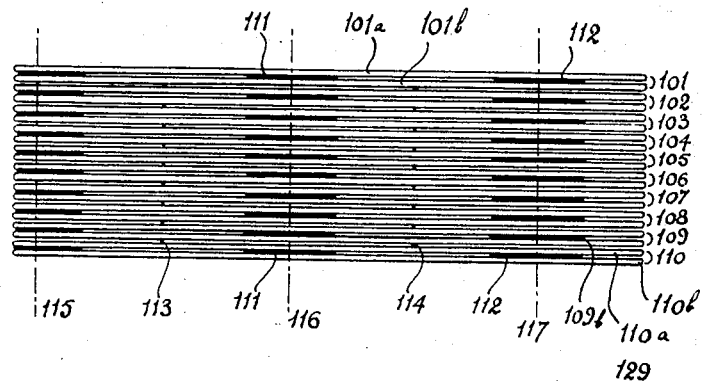
Figure 25:
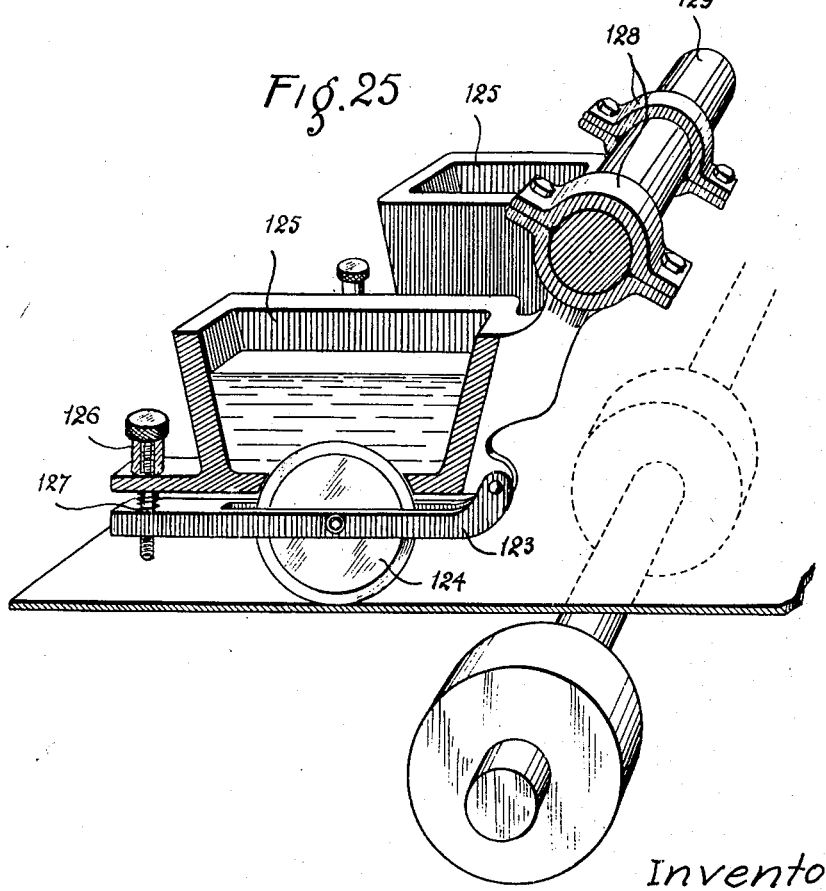

Figs. 13 and 14 respectively are a vertical section and a plan of a modification involving two gumming units facing each other;

Figs. 15 and 16 are similar views of a machine including a sector-gumming unit;

Fig. 17 shows a perspective view of a two-part packing structure specially designed for packing eggs;

Fig. 18 is a fragmentary view on an enlarged scale of packing structure according to the invention;

Fig. 19 is a perspective sectional view of a cold-storage case for eggs;

Fig. 20 shows an outer view of the case;

Fig. 21 is a diagrammatic plan view of a two-part packing structure for bottles;

Fig. 22 is a diagrammatic elevational view showing a three-part packing structure for tubes;

Fig. 23 is a corresponding plan view;

Fig. 24 is a fragmentary view in cross section of a pad used according to the invention for the manufacture of individual cases;

Fig. 25 is a diagrammatic detail view relating to a gumming unit for the production of such plate assemblies;

Fig. 26 is a partial view in section of a pad for individual cases made of single-face corrugated cardboard;

Fig. 27 is a partial view in section of an egg-packing pad made of single-face corrugated cardboard with asymmetrical cell-structure;

Fig. 28 is a detail view relating to the gumming of sheets for the production of pads according to Fig. 4;

Fig. 29 is a diagrammatic plan view of an automatic machine for producing packing means according to the invention from single-face corrugated cardboard;

Fig. 30 is a partial diagrammatic view in section on line X—X of Fig. 6;

Fig. 31 is a partial view on an enlarged scale in section on line Y—Y of Fig. 6;

Figs. 32 and 33 are detail views, respectively in elevation and plan, partially in section, of a retracting and displacing device for the gumming shaft;

Fig. 34 is a diagrammatic detail view of the so-called distributor;

Fig. 35 is a detail view relating to a transmission system; and gumming-shaft retracting means;

Fig. 36 is a view of the finger which operates the contacts in the supply circuit of the retracting magnets.

Figure 1:
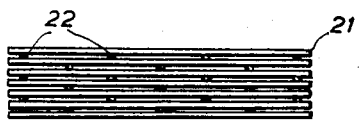
Figure 2:
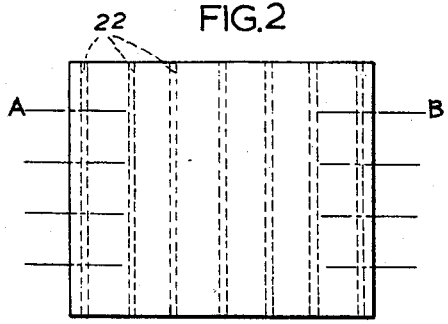

As shown in Figs. 1 and 2, a pad or lamination of sheets consists of a flat laminated assembly of sheets 21 adhesively interassembled by lines or strips of glue 22 applied in alternately staggered positions in the successive sheets. This pad of sheets is then divided perpendicularly to the lines of assembly by cuts such as A—B the spacing between the cutting lines corresponding with the height or depth dimension of the desired cells.

Figure 3:
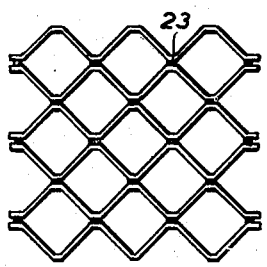

By varying the pattern, spacing and width of the stripes of glue, an extremely wide range of different cell configurations may be obtained. Thus, Fig. 3 shows in expanded condition a substantially square cell or mesh structure obtained by using comparatively narrow strips 23 of glue.

In Fig. 4, a honeycomb cell structure is shown consisting of equal-sided hexagonal cells, obtained by providing a spacing between the adjacent glue-stripes equivalent to three times the width of each stripe. In this case, as in every case where the cell structure is somewhat complex in configuration, it is preferable before proceeding to assemble the sheets, to draw score lines thereon in positions corresponding to the folds or bends which they are to assume after the expanding step. Thus, in the case of Fig. 4, score lines are drawn along the equispaced lines $a$, $b$, $c$, $d$, etc.

Figure 5:
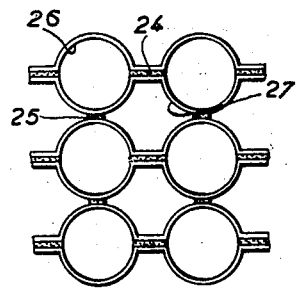

Fig. 5 shows in what manner there may be obtained a cell structure consisting of ranks of spaced round cells 26, the adjacent ranks being separated by interventing ranks of concave-sided cells 27, which may serve to impart a certain resiliency to, or further to ventilate, the packing means. For this purpose alternating wide lines 24, and narrower lines 25 of glue are provided.

Fig. 6 shows an example of cell structure in which ranks of hexagonal cells such as 28 are separated by triple ranks of smaller cells 29. This also imparts great flexibility to the structure.

Figure 7:
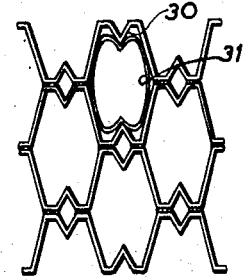

Fig. 7 shows a peculiar structure suitable for example for articles having the outline shown at 31, with side grooves the cells being formed with projecting ribs 30 engaging the grooves of the articles to firmly position the same.

Figure 8:
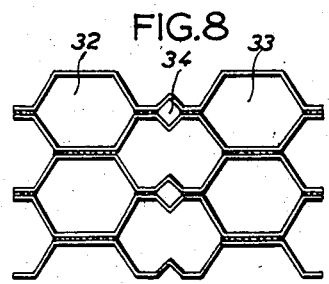

Fig. 8 shows successive ranks 32, 33 of hexagonal cells separated by ranks of spacer cells which may be adjusted in width by spreading out more or less the folds 34.

Figure 9:
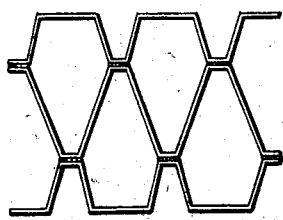

Fig. 9 shows a typical interfitting asymmetrical cell structure which may be used e. g. in connection with flasks having a corresponding outline.

It will be obvious that the few typical configurations of cell structures according to the invention shown and described above by no means exhaust the possibilities afforded by the invention, which may be varied ad infinitum.

The sheets used may be made from any suitable materials depending on the particular use to which the packing means are to be put; thus such materials as cardboard, corrugated cardboard, various agglomerated sheet materials, felt, various plastic sheet materials, etc., may be used.

Figure 10:
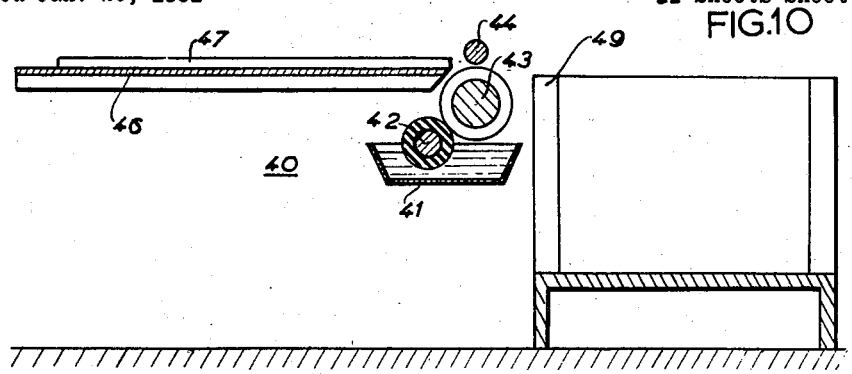
Figure 11:
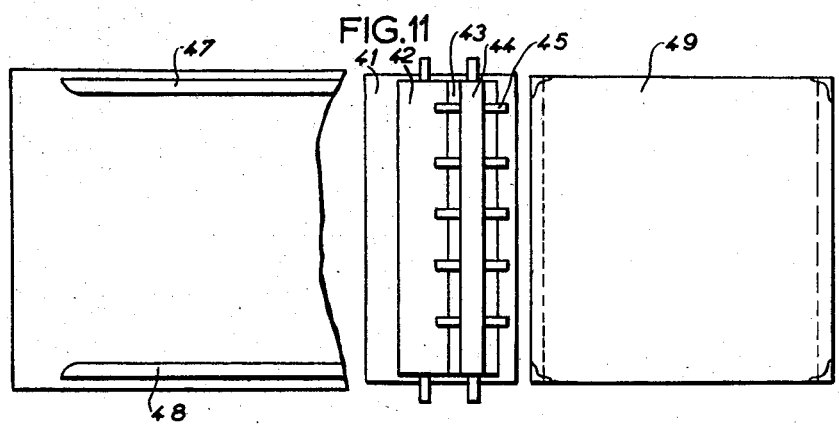
Fig. 11 is a corresponding plan view.

Figs. 10 and 11 show one example of a machine which may be used in the production of cellular packing means of the above-described type. The machine comprises a gumming unit 40, which in turn consists of a trough 41 containing glue, a glue-transfer roller 42, a gumming roller 43 and a presser roller 44. The gumming roller is formed with shoulders of enlargements 45 along the areas which are to deposit glue on the sheets. These shoulders may be obtained in various ways, as by cutting, milling, applying separate hoops or discs, etc. The width and spacing of the enlargements are predetermined in relation with the particular pattern of cell structure to be obtained.

To one side of the gluing machine 40 there is arranged a charging or feed table 46 provided with two marginal strips 47 and 48 to the left and right respectively. The spacing between these side strips is equal to the width of the sheets plus the distance between two successive lines of glue in two successive sheets.

At their outlet from the gluing machine, the sheets are stacked in a frame or casing 49 for the drying step, which may be natural or forced.

Let it be assumed by way of example that the cell structure to be produced has the following specifications:

| | Mm. |
|---|---|
| Width of the sheets | 340 |
| Width of the gummed strips | 5 |
| Spacing of the gummed strips across a given sheet | 100 |
| Displacement of the gummed strips from one sheet to the next | 50 |

The gumming roller required to fulfill these specifications will be formed as follows:

| | Mm. |
|---|---|
| Number of gumming ribs | 4 |
| Width of the ribs | 5 |
| Spacing between ribs | 100 |

The spacing across the marginal strips will equal 340+50=390 mm.

The following procedure may be used.

A first sheet (No. 1) is placed on the bottom of the frame 49 without being gummed. Next, sheet No. 2 is placed in the gumming unit against the left-hand marginal strip. At its delivery from the gumming unit, this sheet is deposited over sheet No. 1. Sheet No. 3 is then placed in the gumming unit against the right-hand marginal strip. At its discharge from the gumming unit it is deposited over sheet No. 2.

Thus all the sheets are successively passed through the gumming unit with the even sheets being fed against the left-hand marginal strip and the odd sheets against the right hand strip (or vice versa).

After the glue has dried, the laminated assembly is cut on lines perpendicular to the gummed lines at spacings corresponding to the depth of the cells which it is desired to produce. If required by the nature of the sheet material being treated a manual or mechanical presser means may be provided at the discharge of the gumming machine to ensure proper adhesion between the successive sheets.

Figure 12:
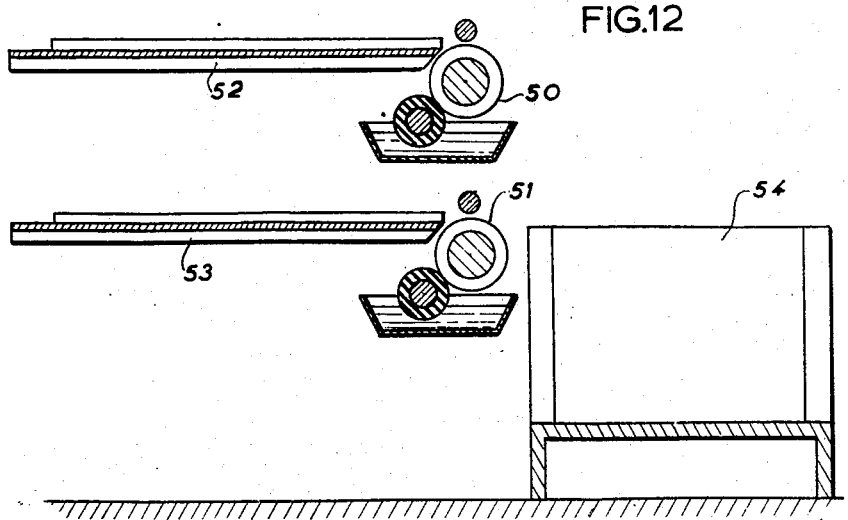
Fig. 12 is a view similar to Fig. 10, but showing a modification including two superimposed gumming units.

A drawback of the above-described machine and method is that the sheets have to be received or collected as they are discharged from the gumming unit and stacked in superimposed registry in a frame whereas they are discharged in staggered relation from the gumming machine. To avoid this, a machine such as shown in Fig. 12 may for instance be used, which comprises a pair of ordinary gumming units one over the other. A first gumming unit 50 has its gumming roller designed for the even sheets and a second gumming unit 51 has its roller designed for the odd sheets. These gumming units are respectively associated with feed tables 52, 53 placed one above the other and each having only one marginal ruler so arranged relatively to one another that the sheets are discharged in aligned relationship and in registry with the frame 54.

One or two additional rollers may be provided above the upper gumming unit in order to take care of the initial, gum-free sheet, with or without a reversal in the direction of feed. An interlock device may be provided between both gumming units to prevent possible error in the feed of the sheets thereinto.

Figs. 13 and 14 illustrate a modification of such a machine wherein the gumming units 50—51 are arranged in face-to-face relationship on either side of the frame 54, rather than being one above the other.

Figs. 15 and 16 show a somewhat different type of machine, equiped with a sector-gumming unit. A gumming unit 55 is provided with a gumming roller 56 carrying two sets of sectors 57, 58, the sectors in each set extending over 180° and being sufficiently large in diameter to provide a gummed strip of the requisite length in one half-revolution of the roller. Both sets are staggered by an amount corresponding to the spacing between the gummed strips of an odd and an even sheet.

Let it be assumed for example that a cell structure is to be produced having a depth dimension of 50 mm., by the use of sheets 500 mm. long (i. e. a series of ten cell structures). The gummed strips will be 500 mm. in length, this leading to the use of a normal gumming cylinder $$\frac{500}{\pi}$$

or about 160 mm. in diameter. By imparting to the gumming cylinder a diameter of 320 mm., the gummed strip will be obtained in a half revolution. Therefore the sectors 57 and 58 should be provided with a diameter equal to or greater than 320 mm.

The sheet-feeding device includes in this case a feed or charging table 59 above which is a supply frame 60 containing a stack of blank sheets to be gummed, and associated with a synchronously-operating conveyor mechanism comprising one or more endless chains 61 extending at one end over a sprocket pinion 62 carried by a drive shaft 63, and at the other over guide sprockets 64, and pusher or feeder elements 65 on the chains. The drive shaft 63 is driven in synchronism with the gumming roller 56 (by means not shown) and the pushers are spaced from one another by an amount corresponding to the arcuate length of each sector.

By means of this arrangement, the feed of sheets and rotation of the cylinders is synchronized, so that, for instance, all of the sectors 57 will act to gum the even sheets and all the sectors 58 will act to gum the odd sheets. Such a machine makes it possible to gum uniformly and automatically sheets of any length within a range of from zero to a length equivalent to the arc of the sectors.

Experience has shown that difficulties sometimes arise in connection with the packing of certain articles, such as eggs, bottles, etc., especially at the extraction of the packed articles from their cells, e. g. when the articles have been sold to the consumer. To facilitate such extraction, it may accordingly sometimes be desirable to divide the cell structure which is to receive a single tier of articles, into two or more parts along its depth dimension.

As shown in perspective in Fig. 17, a cell structure designed for receiving a tier of eggs therein consists of two parts A and B, shown as equal in depth each say 30 mm. deep. The eggs are very easily placed into the lower cell section which automatically adjusted itself with great flexibility to the shape of the eggs. The upper cell section B is then placed over the eggs, also a very simple operation.

The cell structures of the invention are of course delivered for sale or use in flat or collapsed condition. They are divided in two throughout their length except at a portion at one end thereof, and the user may separate them at the time of use. Thus the two half-structures are always sure to register perfectly with each other. However, the previously-described methods of production make possible accurate formation so that successive cell structures are interchangeable and it is thus possible to deliver the semistructures entirely separate from one another.

As shown in Fig. 18, each strip of sheet composing a cell structure consists of a smooth sheet D lined with a corrugated sheet C; thus, the sheet product known as single-faced corrugated cardboard may be used. However, the smooth and/or the corrugated sheet of the assembly may be made from materials other than cardboard; also, as previously stated, other types of cell structures may be used.

The initial sheet may consist of only a smooth sheet; or, where the initial sheet consists of a corrugated lined with a smooth sheet as do the other sheets of the structure, the smooth sheet may be entirely different from the smooth sheets of the remaining parts of the cell structure. Thus, the smooth sheets in all of the strips may be made of ordinary paper, while the smooth sheet of the initial strip may, for some special purpose (e. g. display, advertizing, etc.) consist of a sheet of printed or metallized paper or other substance (e. g. metal foil, fabric, felt, cellophane, etc.).

One or more of the strips may further be inverted. Thus, the last strip may be assembled in inverted condition so as to have its smooth sheet outside like the initial strip. Conversely, the initial strip may be assembled in inverted condition if it is desired that its corrugated sheet be outside.

Tests have shown that the above-described packing structure is very efficient; thus, a case of 360 non-sized eggs was subjected in a mixing drum to six successive falls. When the case was opened only one egg was found to have been cracked.

Figs. 19 and 20 show an egg case according to the invention especially designed for keeping eggs in cold storage while in packed condition.

As shown a case 70 made of corrugated cardboard contains four tiers 71 to 74 of 90 eggs each for example, there being a sheet of cardboard such as 75 separating each adjacent pair of tiers, and also separating the eggs of each of the top and bottom tier from the top and bottom wall, respectively, of the case. Each tier of eggs is packed in a pair of semi-cell structures such as A', B' similar to the semi-structures A, B shown in Fig. 17 and described above, but preferably only about 25 mm. rather than 30 mm. deep. After the eggs have been placed in the lower semi-structure A' and before they are covered with the upper semi-structure B', strips of cardboard (or other suitable material) such as 76 are inserted to form spacer shims 10 mm. high. These shims serve to provide gaps for the circulation of ventilating air.

The case designed for receiving such cell structures therein is provided with ranks of perforations such as 77 for promoting such air circulation.

Fig. 21 diagrammatically illustrates one example of a cell-structure made of two semi-structures differing in shape, and especially suitable for the packing of bottles. A semi-cell structure 80 is adapted to receive the body of the bottles, while the necks of the bottles are engaged in a semi-cell structure 81 comprising cells 82 of suitably restricted area. Obviously, it is not necessary that the cells 80 extend throughout the whole height of the body of the bottles.

Generally speaking, where the article to be packed has a considerable height dimension relatively to the dimensions of its horizontal section, it is desirable to use two or more cell structures of restricted depth.

Thus, Figs. 22 and 23 illustrate packing means for cylindrical tubes having e. g. 40 mm. in diameter and 300 mm. in height or length. The tubes 83 are packed by means of three cell structure elements each 50 mm. in depth; there is a lower cell structure 84, a central structure 85 and an upper structure 86. The resiliency of cell structures according to the invention is sufficient to ensure that the packed article is held tightly in position and will not tend to slip.

In certain applications, as in particular for packing electric bulbs, electronic tubes, wine-bottles, champagne-bottles, etc., it is desirable to retain the article in its packing when sold. Since the articles are frequently sold by the unit, this leads to the provision of individual cases. The same general method is used as previously described, involving pads of laminated sheets. In this aspect of the invention however, glue is applied along strips wide enough to allow the pad to be cut along planes extending through the centre lines of said strips, and these strips are interspersed with less heavily gummed lines for temporarily interconnecting the stacked individual cases in such a way as to allow them to be quite easily separated for use.

Thus, in the embodiment diagrammatically illustrated in Fig. 24, there is shown a laminated pad for the manufacture of individual cases, and comprising ten stacked pairs of sheets 101 to 110. Both sheets in any pair, such as the sheets 101a and 101b of the pair 101 are interconnected by so-called main gummed strips 111, 112 providing a strongly adherent connection over a substantial width. The consecutive pairs of sheets are interconnected by so-called temporary gummed lines 113, 114 which are narrow and are not highly adherent, and which may be continuous lines or broken lines or spots, as desired.

The pad thus prepared, if necessary first cut to a suitable length in a plane parallel with that of the drawing, is then cut on the lines 115, 116, 117 through the centre lines of the main strips of glue 111, 112. This provides packs or stacks each consisting of ten individual cases, each pad including a round number of, say ten, such stacks. Owing to the strength of the main lines of glue 111, 112, each individual case forms a perfectly strong unit, while the individual cases in each pack are only weakly bound to one another by the weak lines of glue 113, 114, so that, in use, the cases may be easily pulled apart either singly, or in groups of twos or threes, as may be desired, for instance by the retailer when selling one or more articles to a customer.

This method of grouping the individual cases at manufacture and in use brings considerable facility in the cutting, handling and counting operations.

Fig. 25 diagrammatically illustrates one way of constructing a gumming apparatus for carrying into effect the method just described. A sheet such as 120 is passed through a gumming unit comprising a shaft 121 provided with gumming discs 122 which are to apply the main lines of glue and are fed with glue from a tank not shown. The sheet 120 is passed over the discs 122 and under a set of smaller discs 124 mounted in stirrups such as 123 each pivoted to a small tank or pot of glue 125 and the said small discs project at their top into apertures formed in the bottom of the pots. The degree of penetration of the discs 124 into the pots, and consequently the amount of glue fed to them is controlled by a screw 126 cooperating with a spring 127. Each tank or pot is secured by a collar 128 to a shaft 129. The discs 124 are driven in rotation by friction from the sheet fed past them. By merely imparting to the shaft 128 a slight angular displacement, the discs 124 may be raised to an idle position. Similarly, a downwardly-retracted idle position is preferably provided for the shaft 121.

To prepare a pad such as that shown, in Fig. 24, an initial glue-free sheet is first passed through the apparatus; this will form the lowermost sheet of the pad (110b, Fig. 24). Over this initial sheet there is passed a sheet 110a provided by its passage through the gumming unit with the main gummed strips 111, 112 applied to its under face by the discs 122, and with the temporary gummed lines 113, 114 applied to its upper face by the smaller discs 124. The next sheet 109b is laid over the former one without any glue applied to it, and the pad-forming process is thus continued by successively laying alternately gummed and gum-free sheets; the uppermost sheet 101a of the pad is provided with the main gummed strips 111, 112 but lacks the temporary gummed lines 113, 114.

If single-faced corrugated cardboard sheets are used, that is sheets consisting of a flat or smooth sheet associated with a corrugated sheet, asymmetrical individual cases are obtained if the successive sheets are fed to the machine all in the same position. It may be advantageous however to provide symmetrical cases, and this will require a reversal of every other sheet. Fig. 26 diagrammatically illustrated in section a pad of individual cases constructed in this way. This pad is made up of a series of pairs of single-faced corrugated cardboard sheets 131, 132, 133, etc., both sheets of a common pair such as the sheets 131a and 131b of the pair 131 being so arranged that their corrugations interfit with each other.

The lower sheet in each pair is left free of glue and is stacked with its corrugated side up. The upper sheet in each pair is fed through the machine corrugated side down. It has the strong gummed strips applied to its corrugated side from the rings or discs 122 (Fig. 25) and the temporary gummed lines applied to its smooth side from the small discs 124. The gummed pads are then cut along the planes 138, 139 extending centrally of the main gummed strips 135, 136.

It is also possible to feed all of the sheets through the machine provided every other sheet of the stack be inverted. In this case, the glue is applied twice; once at the crest and once in the valley of the corrugations for the main gumming operation, and two temporary gumlines offset by one half a corrugation "wavelength" instead of only one temporary line.

This example illustrates a difficulty inherent to the use of single-faced corrugated cardboard in the method of the invention; for, whenever the lines of glue have to be applied to the tops of a small number of corrugations, it is important that said corrugations be properly presented to the gumming discs. A "phase-adjusting" operation has to be carried out on the corrugations relatively to a fixed reference line, in all the sheets which are to be gummed according to a predetermined pattern.

This difficulty is also encountered in the manufacture of cell-like packing structures for eggs or the like of the type shown in Figs. 17 and 18 and described hereinabove, which form asymmetrical cells between sheets of single-faced corrugated cardboard which are merely stacked without any of them being inverted.

A pad prepared for the manufacture of such a packing means is shown in cross section in Fig. 27. It comprises a number of sheets of single-faced corrugated cardboard 140, 141, 142 ... 146. The lowermost sheet 140 is not gummed; the sheets of odd denomination 141, 143, 145 ... are provided with gummed lines applied to the ridge or crest of two corrugations to either side of the lines 147; the sheets of even denomination are similarly provided with glue on the crests of two corrugations to either side of lines 148 interspersed with the lines 147.

Fig. 28 shows on an enlarged scale, during the gumming process, a single-faced corrugated sheet consisting of a smooth flat sheet 151 supporting a corrugated sheet 152, two corrugations 153, 154 being provided with glue from a gumming disc 155 for the production of cells in which the centre lines will be as at 156.

It will be seen that in such a case, it is important that the sheets be positioned in accurate lateral register with the gumming disc, the degree of accuracy or tolerance on such positioning corresponding to a comparatively small percentage of the pitch or "wavelength" of the corrugations.

Various means may be devised for assuring this "phase-adjustment" of the corrugations in order that their initial engagement with the gumming discs should always be effected in a similar position. Thus, the sheets may all be cut strictly along a similarly-positioned line, for instance along the bottom of a corrugation. Or, if it is desired to avoid having to accomplish this preliminary step, the sheets may be caused to interfit with one or more splines on the feed table, so as to positively locate the relative position of the corrugations.

A machine will now be described for automatically achieving a similar result and at the same time to provide successive packs or pads each containing a predetermined number of sheets glued to one another according to any predetermined pattern, the initial sheet of each pack being passed through the machine without having glue applied to it in order that the packs should be separate from one another; the sheets used are single-faced corrugated cardboard, and the sheets in each pack are not counted in advance.

The machine illustrated in Fig. 29 comprises an automatic feeding table 160 of a well-known type, and a stack of sheets 161 is laid on the table against centering squares 162, 163 thereof. The table is provided with a sliding marginal rule or pusher 164, adjustably secured at both ends as at 165 and 166 on slideways 167, 168 (also see Figs. 30 and 31) slidable in the table by dovetail grooves engaging with appropriate guides 169. The slideways have a reciprocating motion imparted to them from a main or primary shaft 171 journalled in bearings 172. The shaft 171 is provided for this purpose with a crank 173 adapted through a connecting rod 174 to drive an intermediate rack member 175 meshing with a gear 177 (Fig. 30). This gear is secured on a transverse shaft 176 provided at its opposite end with a similar gear 178, both gears 177 and 178 meshing respectively with racks such as 179 rigid with the slideways 167 and 168. The slideways are flush with the top surface of the feed table and the marginal rule 164 secured in the slots of the slideways at any desired point along their extent, is slightly less in thickness than the cardboard stock used, so as to engage only one sheet at a time. The centering squares 162, 163 are arranged to provide a clearance above the surface of the table somewhat greater than the thickness of a sheet of cardboard, to enable the ruler to pass thereunder and discharge a sheet from the feed table.

The main shaft 171 is driven through a gearing 180—181 and a chain and sprocket transmission 182, 183, 184 from a shaft 185 which may in turn be driven by means of a drive pulley 186.

Secured on the shaft 185 is an engaging roller 187 (Fig. 30). The shaft 185 moreover, through a gear transmission generally designated 188, drives a further engaging roller 189 cooperating with the roller 187, and it also successively drives a pair of shafts 190, 191 carrying circular cutter discs 192, ahead of the cutters and also driven through the gearing 188, is the gumming unit.

The gumming unit comprises a pair of engaging rollers 193, 194, a pair of glue-collecting rollers 195, 196, arranged one over the other, the lower roller 195 dipping into a glue trough 197, a gumming roller 198 provided with discs 199 and a presser roller 200 (not shown in Fig. 29).

The shaft 198 of the gumming roller (Fig. 29) is splined in an area thereof around which its drive pinion 201 is fitted, and it is journalled in bearings 202 supported on the sides of the machine by brackets 204 (also see Figs. 32 and 33) pivoted at 205 on the shaft of the upper gumming roller 196. The brackets are provided with counterweights 206 at one end thereof, while at their opposite end they constitute the movable armature of a so-called retracting magnet 208. When these electro-magnets are energized, the disc-carrying gumming roller 198 is slightly lowered in the direction of the arrow A in Fig. 30, allowing a sheet to pass through without applying glue to it.

The ends of the gumming disc shaft 198 moreover carry the movable armatures 210 of fixed, so-called shifting, electro-magnets arranged endwise in alignment with the shaft and adapted to shift the shaft either to a leftward position (as shown in Fig. 29) or to a rightward position, the spacing between both positions being equivalent to one half the spacing between adjacent gumming discs 199. Both these side positions of the shaft 198 are defined with accuracy by stops 212 formed with an annular groove 213 and cooperating with a ball 214 urged by a spring 215 fitted in an appendage 216 of the brackets 204.

A suitable amount of radial play is provided within the winding of the shifting electro-magnets 201 to take care of the very low amount of rocking movement of the shaft 195 under the action of the retracting magnets 208.

The energizing windings of the magnets 211 are supplied with current through wires $a$ and $b$, the circuit being assumed to be completed through ground; the wires $a$ and $b$ are respectively connected (Fig. 29) to a double-throw switch 215 through which they may be selectively and alternately connected with the wires 216—217 leading to a distributor 218. This distributor, diagrammatically illustrated in Fig. 34, includes an insulating drum member 218, two metallic sectors 219, 220 in diametrically opposed positions on the drum, the two wires 216, 217 respectively leading to said sectors, and a brush 22 engaging the drum; the brush 22 is carried on a shaft 222 and is connected to the source of current 226. The shaft 222 is coupled through an insulating bushing 227 to a shaft driven from the main shaft 171 through a reducer gearing 229 having a reducing ratio 1:2. It will be seen that, under such conditions, a current pulse is alternately fed to the left and right hand one of the electromagnets 211 at each revolution of the main shaft 171.

The shifting magnets 211, instead of being mounted at the ends of the shaft, may of course be made to act on the ends of the shaft 198 through an appropriate pivoted connection which would provide increased flexibility of adjustment.

The right end of the main shaft 171 (also see Figs. 35, 36) acting through a reducer gearing 230, drives an intermediate shaft 231 which in turn, through a throw-over pinion 232 and a gear 233, drives a shaft 234 on which a disc 235 is secured. This disc carries a finger 236 adjustably secured in an annular groove 207 and acting, once for each revolution of the shaft 234, to close a pair of contacts 238. These contacts are inserted in the supply circuit (not shown) of the retracting magnets 208 and when closed act to rock the levers 204 resulting in a downward movement of the gummer roll shaft 198, the duration of the closing period of the contacts 238 being long enough to ensure that the gummer roll will remain retracted throughout the feed of a sheet through the machine.

The main feature of the machine and more specifically of the feed table consists in a comb 240 (Figs. 30, 31) consisting of a plate of metal, wood or any suitable material formed in its upper face with imprints or depressions similar to the corrugations of the cardboard stock used, and equal in pitch thereto. These imprints project above the table so as to engage with the corrugations of a sheet of cardboard laid on said table. The comb projects through an aperture 241 formed for this purpose in the table, and is mounted for sliding movement in a transverse direction by dovetail slideways 242. The comb is provided on one of its sides with two rollers 243 engaging cams 245 carried by a longitudinally extending shaft 246 revolving at the same speed as the primary shaft 271, and driven therefrom through a bevel gearing 247. The cams 245 are so conformed as to impart to the comb 240 a translatory motion equal in amplitude to one half the pitch of the corrugations during one semi-revolution of the main shaft 171. Return springs 248 restore the comb to its idle position.

The cams are secured on the shaft 246 in such a way as to ensure that the displacement of the comb will occur during the periods where the marginal ruler 164 recedes.

In the operation of the apparatus, a number of sheets 161 are stacked at all times against the centering squares 162, 163. The marginal rule 164 being in its retracted position, the cams assume the positions of Fig. 31 with the comb 240 pushed back towards the left. As shown in the figure, the corrugations of the lowermost sheet such as 161a do not generally register accurately with the corrugations of the comb, but as the cams 245 revolve with the main shaft the comb is allowed to return rightwards under the action of the return springs 248, and during this movement equal in amplitude to one half the pitch of the corrugations, the corrugations of the lowermost sheet will necessarily drop into those of the comb, so that as the comb returns to its rest position (rightwards in Fig. 31) the sheet will be accurately centered in an accurately located position of its corrugations.

The position of the pusher 164 along the slideways 167—168 is so adjusted that after the pusher has engaged the initial sheet after the comb has returned to its idle position, the pusher will then push said initial sheet forwards to bring it into engagement with the engaging rollers 187, 189. These rollers continue to feed the sheet successively between the circular cutters 192 which act to trim the sheet, then to the gumming unit in which the sheet is engaged in the nip of the engaging rollers 193, 194 disposed immediately adjacent the gumming roller 198. Normally, lines of glue are applied to the sheet held in contact with the gumming discs by the presser roller 200. In the case where a sheet is to be passed without gumming, the lowered position of the gumming roller 198, the closely adjacent position of the engaging rollers 193—194 prevents the sheet from sagging under its own weight sufficiently to contact the gumming discs; in other words, a relatively short downward displacement of the gumming roller may be provided, e. g. only a few millimeters.

As the distributor 218 alternately energizes the left and right shifting magnets 211 at each revolution of the main shaft 171, the alternate sheets will be gummed on the right and on the left side. The position of the finger 236 (Fig. 36) and the speed of rotation of the disc 235 should, moreover, be so adjusted as to ensure that the gumming roller will be lowered during the feed of the initial sheet of each pad; thus, in the case of pads each containing twenty sheets, the disc 235 will have to complete one revolution for every twenty revolutions of the main shaft 171.

It may be necessary moreover to have the possibility of selecting at will the particular (left or right) side on which the initial gummed sheet of each pad is to be gummed; for this purpose, it is merely necessary to select accordingly the position of the reverser 215, this position being determined by the wire *a* or *b*, and hence it will be the left or right shifting magnet which will have the initial impulse fed to it.

If it is desired that the side on which the first gummed sheet is to be gummed be altered systematically at the beginning of each new pad, it would be a simple matter to provide an automatic control device similar to that described above in connection with the retracting magnets 208, for automatically reversing the position of the switch 215.

To shift to the production of pads including a different number of sheets, it is only necessary to alter the reducing ratio for the shaft 234 (Figs. 35, 36) for example by replacing the throw-over pinion 232 by a different one. The duration of the energized period of the retracting magnets may also be adjusted to correspond with the duration of the feed of the sheet through the machine by the use of a time-relay, or by synchronization with the rotation of the main shaft, or in any other suitable way.

Stacking the sheets discharged from the machine is easy to accomplish, since the sheets are trimmed by the fixed circular cutters, at definite fixed locations relatively to the corrugations; it is only necessary to stack the sheets accordingly by bringing them in register with a centering angle member. This operation may be effected manually or preferably by means of a pivoted arm provided with suction grippers supplied with vacuum from an air pump; said arm being operated in timed relationship with the rotation of the primary shaft. It is preferable in this case to impart to the receiving table a vertical downward step-by-step translatory movement in timed relationship with the rotation of the primary shaft, and by an amount equivalent to the thickness of one cardboard sheet, once at every revolution of the primary shaft; thus, the pneumatic suction arm will always lay the sheets at a constant level.

It will be seen that the machine described will automatically perform the following operations:

Trim the sides along lines extending parallel to, and at a constant relative distance from the corrugations;

Apply glue to every one sheet out of two, on the right side;

Apply glue to every other sheet on the left-side;

Omit applying glue to sheet No. 1;

Follow a predetermined gumming pattern for any given set of sheets (e. g. gumming twenty sheets, the initial sheet being left free of glue and the second sheet being gummed on the left side).

It will be understood that the machine described is but one example of many possible embodiments, and the arrangements described and illustrated are in no way restrictive in character. Thus, for example, a similar pattern may be obtained by the use of the sector gumming unit described with reference to Figs. 15 and 16, in which case the gummer-roll shifting device would be superfluous and may be omitted; for it would only be necessary to provide for the possibility of displacing the gumming roller 180° at each new pad, if the initial gumming operation in each pad should be performed on alternately opposite sides from one pad to the next.

It is to be noted that gumming units of the sector type are particularly suitable for provision of patterns which must be different (in number, width and/or spacing of the glue strips) for odd and even sheets, to obtain for example structures as those shown in Figs. 5, 6 and 8.

What I claim is:

1. Packing means for eggs, fruit, bottles, flasks, electric light bulbs and like fragile articles which comprises a stack of superposed sheets of corrugated cardboard formed from a planar sheet element and a corrugated sheet element adhesively secured thereto, said sheets carrying adhesive on one side thereof along parallel spaced lines extending in the longitudinal direction of the corrugations of the cardboard, the lines of adhesive carried by a sheet in said stack being displaced laterally in relation to the lines of adhesive carried by the sheets overlying each face of said first-named sheet, whereby said adhesive lines are alternately staggered from one sheet to the other to define a network of cells, at least some of which are of a size to receive the article to be packed, the number of lines of adhesive carried by each sheet being less than the number of corrugations in said sheet with said lines of adhesive overlying the corrugations in some portions of each sheet and leaving a plurality of corrugations between adjacent lines of adhesive in other portions of each sheet.

2. Packing means as defined in claim 1, wherein some of said lines of adhesive form a strong bond between adjacent sheets and other lines of adhesive form temporary, readily frangible bonds between said sheets.

3. Packing means as defined in claim 1, wherein the first and last sheet of said stack is covered with a sheet of flexible material for receiving any desired printed matter thereon.

4. Packing means as defined in claim 1, wherein said lines of adhesive are applied to some of the crests only of the corrugations of said sheets.

5. Packing means as defined in claim 1, wherein the lines of adhesive on one side of each sheet provide a strong bond with the adjacent sheet and the lines of adhesive on the other side of each sheet provide a weak bond with the adjacent sheet, said stack being subdivided along lines extending through the center lines of said adhesive lines providing strong bonds whereby to define a plurality of packs of individual units adapted to be separated from one another along said lines of adhesive providing the weak bonds.

6. In a packing for eggs, fruit, bottles, flasks, electric light bulbs and like fragile articles, a plurality of vertically superposed tiers of packing means defining cells for reception of said articles, each tier of said packing means comprising a stack of superposed sheets of corrugated cardboard formed from a planar sheet element and a corrugated sheet element adhesively secured thereto, said sheets carrying adhesive on one side thereof along parallel spaced lines extending in the longitudinal direction of the corrugations of the cardboard, the lines of adhesive carried by a sheet in said stack being displaced laterally in relation to the lines of adhesive carried by the sheets overlying each face of said first-named sheet, whereby said adhesive lines are alternately staggered from one sheet to the other to define a network of said cells with said lines of adhesive overlying the corrugations in some portions of each sheet and leaving a plurality of corrugations between adjacent lines of adhesive in other portions of each sheet, said tiers having a vertical height less than the vertical height of the articles packed, whereby each article is embraced by more than one tier of said packing means.

7. In a packing as defined in claim 6, spacer shims disposed between the horizontal tiers enclosing each article to maintain gaps therebetween.

8. A packing for fragile articles comprising a case having a bottom and side walls, a first sheet of flexible material resting on the bottom of said case, a tier of packing means defining a plurality of cells for receiving the articles to be packed disposed on said first sheet, said tier comprising a stack of sheets of corrugated cardboard formed from a planar sheet element and a corrugated sheet element adhesively secured thereto, said sheets carrying adhesive on one side thereof along parallel spaced lines extending in the longitudinal direction of the corrugations of the cardboard, the lines of adhesive carried by a sheet in said stack being displaced laterally in relation to the lines of adhesive carried by the sheets overlying each face of said first-named sheet, whereby said adhesive lines are alternately staggered in passing from one sheet to the other to define a network of said cells with said lines of adhesive overlying the corrugations in some portions of each sheet and leaving a plurality of corrugations between adjacent lines of adhesive in other portions of each sheet, a plurality of spacer shims overlying said first tier, and a second tier of said packing means overlying said spacer shims, and a second sheet of flexible material overlying said second tier, at least one pair of opposite walls of said case being provided with apertures at the vertical level of said spacer shims.

9. A packing as defined in claim 8, further comprising a plurality of second pairs of tiers of packing means lying above said second flexible sheet with interposed spacer shims and flexible sheets lying between each of said second pairs of tiers, said spacer shims being arranged in rows and said apertures being in alignment with each row of spacer shims.

10. Packing means for eggs, fruit, bottles, flasks, electric light bulbs and like fragile articles which comprises a stack of superposed sheets of corrugated cardboard, said sheets carrying adhesive on one side thereof along parallel spaced lines extending in the longitudinal direction of the corrugations of the cardboard, the lines of adhesive carried by a sheet in said stack being displaced laterally in relation to the lines of adhesive carried by the sheets overlying each face of said first-named sheet, whereby said adhesive lines are alternately staggered from one sheet to the other to define a network of cells, at least some of which are of a size to receive the article to be packed, the number of lines of adhesive carried by each sheet being less than the number of corrugations in said sheet with said lines of adhesive overlying the corrugations in some portions of each sheet and leaving a plurality of corrugations between adjacent lines of adhesive in other portions of each sheet, the lines of adhesive on the sheets varying in spacing from one another in predetermined arrangement to define narrow bands and wide bands between lines of adhesive, the arrangement of lines on one sheet alternating with the arrangement of lines on an adjacent sheet to define a network comprising cells for receiving the article to be packed and smaller secondary cells interspersed among the first-named cells.

11. Packing means for eggs, fruit, bottles, flasks, electric light bulbs and like fragile articles which comprises a stack of superposed sheets of corrugated cardboard, said sheets carrying adhesive on one side thereof along parallel spaced lines extending in the longitudinal direction of the corrugations of the cardboard, the lines of adhesive carried by a sheet in said stack being displayed laterally in relation to the lines of adhesive carried by the sheets overlying each face of said first-named sheet, whereby said adhesive lines are alternately staggered from one sheet to the other to define a network of cells, at least some of which are of a size to receive the article to be packed, the number of lines of adhesive carried by each sheet being less than the number of corrugations in said sheet with said lines of adhesive overlying the corrugations in some portions of each sheet and leaving a plurality of corrugations between adjacent lines of adhesive in other portions of each sheet, the arrangement of lines of adhesive on one sheet differing from the arrangement of lines of adhesive on the sheets overlying each face of said first-named sheet but corresponding to the arrangement of lines on the second overlying sheet, whereby to define a network comprising cells for receiving the article to be packed and smaller secondary cells interspersed among the first-named cells.

12. Packing means for eggs, fruit, bottles, flasks, electric light bulbs and like fragile articles which comprises a stack of superposed sheets of corrugated cardboard formed from at least one planar sheet element and a corrugated sheet element adhesively secured thereto, said sheets carrying adhesive on one side thereof along parallel spaced lines extending in the longitudinal direction of the corrugations of the cardboard, the lines of adhesive carried by a sheet in said stack being displaced laterally in relation to the lines of adhesive carried by the sheets overlying each face of said first-named sheet, whereby said adhesive lines are alternately staggered from one sheet to the other to define a network of cells, at least some of which are of a size to receive the article to be packed, the number of lines of adhesive carried by each sheet being less than the number of corrugations in said sheet with said lines of adhesive overlying the corrugations in some portions of each sheet and leaving a plurality of corrugations between adjacent lines of adhesive in other portions of each sheet.

13. Machine for automatically producing packing means of the type described which comprises a feed table for receiving a stack of single-face corrugated cardboard sheets, a continually revolving main shaft associated with said table, a reciprocating pusher for feeding the lowermost sheet in said stack forward at each revolution of said shaft, a rotary feed and cutter device receiving the sheet thus fed forward, at least one roller for applying glue in lines extending in the longitudinal direction of the corrugations of said sheets, means for retracting said roller to allow a sheet to pass therethrough without having glue applied to it, a comb having a surface formed with corrugations corresponding to those of said sheets projecting above the surface of said table, a mechanical drive connection for imparting to said comb a reciprocating displacement equal in amplitude to one half the pitch of said corrugatios at each revolution of said main shaft prior to the engagement of each sheet by said pusher, and retracting-control means for operating said retracting means each time said main shaft has completed a predetermined number of revolutions.

14. Machine as in claim 13 wherein said gumming roller is a disc-carrying roller axially movable to assume one of two different lateral positions, including a left and a right position, and said machine comprises a shifting device for shifting from one to the other of said positions, and a control device for operating said shifting device at each revolution of said main shaft.

References Cited in the file of this patent

UNITED STATES PATENTS

| | | |
|---|---|---|
| 372,894 | Childs | Nov. 8, 1887 |
| 524,568 | Wade | Aug. 14, 1894 |
| 653,812 | La Fleur | July 17, 1900 |
| 765,412 | Budwig | July 19, 1904 |
| 1,802,522 | Moll | Apr. 28, 1931 |
| 2,035,650 | Gustafson | Mar. 31, 1936 |
| 2,049,349 | Blair | July 28, 1936 |
| 2,384,676 | Hill | Sept. 11, 1945 |
| 2,428,979 | May | Oct. 14, 1947 |
| 2,518,164 | Meyer | Aug. 8, 1950 |
| 2,527,752 | May | Oct. 31, 1950 |
| 2,539,966 | Orovig | Jan. 30, 1951 |
| 2,547,880 | Meyer et al. | Apr. 3, 1951 |
| 2,553,054 | Lincoln et al. | May 15, 1951 |
| 2,581,421 | Lombard et al. | Jan. 8, 1952 |
| 2,609,068 | Pajak | Sept. 2, 1952 |
| 2,609,314 | Engel et al. | Sept. 2, 1952 |
| 2,610,934 | Steele | Sept. 16, 1952 |
| 2,647,334 | Wilsher et al. | Aug. 4, 1953 |

FOREIGN PATENTS

| | | |
|---|---|---|
| 226,748 | Germany | Dec. 9, 1908 |
| 433,156 | Great Britain | Aug. 9, 1935 |